April 29, 1952 L. F. GRIFFITH ET AL 2,594,641
CHECK VALVE
Filed Aug. 29, 1946

INVENTORS.
Leonard F. Griffith,
BY Douglas K. McIlvaine
Cromwell, Greist & Warden.
ATTORNEYS.

UNITED STATES PATENT OFFICE 2,594,641

CHECK VALVE

Leonard F. Griffith, Oak Park, and Douglas K. McIlvaine, Des Plaines, Ill., assignors to Henry Valve Company, Incorporated, Chicago, Ill., a corporation of Illinois Application August 29, 1946, Serial No. 693,618

4 Claims. (Cl. 251—144)

This invention relates to improvements in a simple, inexpensive check valve which is yieldable in one direction of flow under predetermined pressure in a gas or liquid flow line, and which functions to prevent said flow at lower pressures, as well as to prevent flow in the reverse direction under any condition.

It is an object of the invention to provide a check valve of the foregoing type which is unfailingly operative, notwithstanding its extreme simplicity and inexpensiveness of construction, said valve including novel valve mounting and guiding means for the movable valve element, adapted to be assembled in a simple housing or fitting in an extremely expeditious manner.

Another object is to provide a check valve of the type described characterized by a smooth, non-turbulent flow of fluid therethrough in operation, this being effected in part by the shape and relative disposition of the housing and valve element and in part by the simplicity and compactness of the aforesaid mounting and guiding provisions for said element.

The foregoing statements are indicative in a general way of the nature of the invention, but other and more specific objects will be apparent to those skilled in the art upon a full understanding of the construction and operation of the device.

A single embodiment of the invention is presented herein for purposes of exemplification, but it will be appreciated that the invention is susceptible of incorporation in other modified forms coming equally within the scope of the appended claims.

Generally speaking, the present invention provides an improved, spring-loaded, pressure-responsive check valve for insertion in liquid or gas flow lines, serving to open the line when a predetermined pressure is reached or exceeded and to maintain the line closed at pressure below said predetermined pressure, as well as to prevent reverse flow under all conditions. Specifically, the invention resides in the provision of highly simplified and inexpensive spider means for guiding the movable valve element of the valve, said means being adapted to be produced from a standard tubular element by simple stamping and forming procedures. The conformation of said mounting and guiding spider is such as to enable ease of assembly into the body of the check valve, and another advantage resides in the directness and non-turbulence of flow through the valve to which it contributes, by reason of the open, unobstructed passage through the valve body which is made possible.

Figure 2:
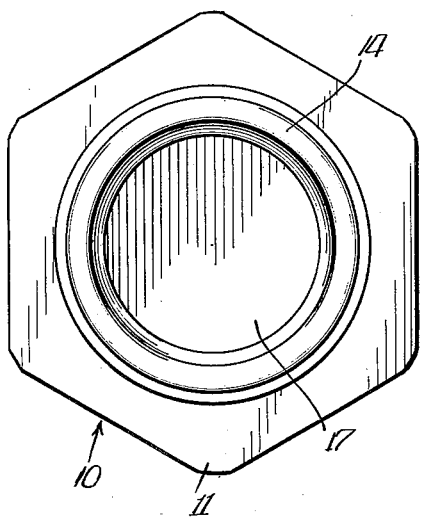
Fig. 2 is a top plan view of a valve, illustrating the character of the stock of which the external housing or fitting is fabricated.
Figure 3:
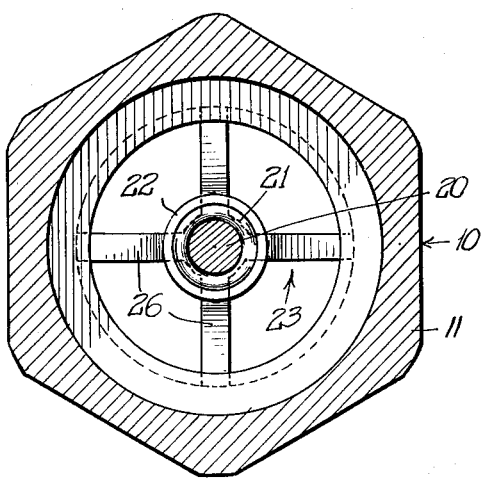
Fig. 3 is a view in horizontal section on a line generally corresponding to line 3—3 of Fig. 3.

Referring to the drawings, the valve, generally designated 10, includes an external body, housing or fitting 11 which can be produced in its entirety on a standard screw machine. Thus, in the form chosen for illustration, the body 11 is machined from a length of standard hexagonal bar stock (see Fig. 2) to provide an enlarged, counterbored valve chamber 12 communicating at one end through a tapered, conical valve seat 13 with a threaded inlet connection or nipple 14. At its opposite end, chamber 12 communicates with a similar threaded outlet connection 15. Between the last named connection and chamber 12 the body is provided with an internal, annular retainer groove 16 for a purpose to be described.

Figure 1:
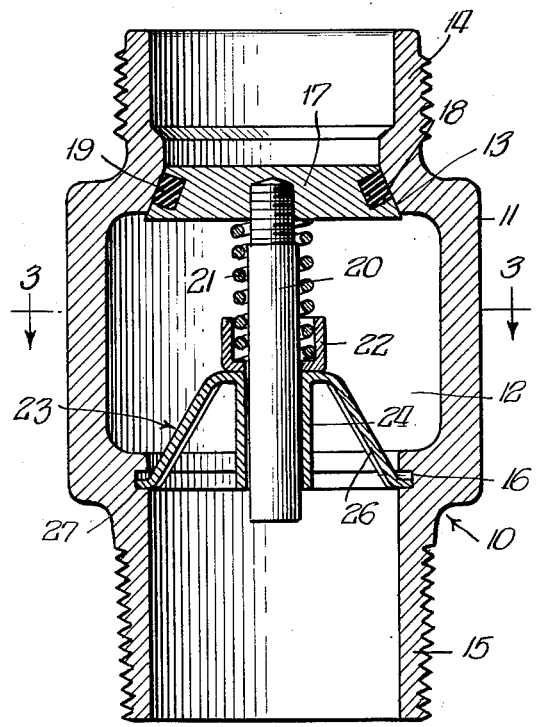
Fig. 1 is a view in central vertical section through the check valve according to the invention.

The valve element per se is designated by the reference numeral 17, being in the form of a flat circular disk having a frusto-conical periphery of the same taper as seat 13. The valve element is annularly recessed on this periphery at 18 for the reception of a resiliently compressible O-ring or packing 19 of natural or synthetic rubber, for example. In the closed position of the valve illustrated in Fig. 1, this packing is compressed substantially to effect a seal against seat 13, but in normal relaxed and uncompressed condition the O-ring will project somewhat outwardly of the tapered valve periphery.

Valve element 17 is carried on the axially reciprocable stem 20 which extends through chamber 12, being surrounded by a coil compression spring 21. Said spring abuts the valve 17 at one end and at the other end abuts a cupped washer or thimble 22 which is axially sustained on the valve mounting and guide spider generally designated 23.

Figure 4:
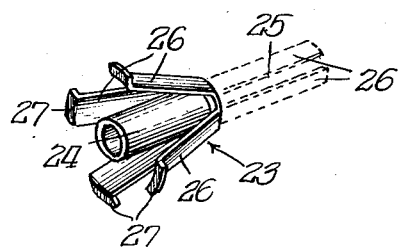
Fig. 4 is a perspective view more clearly illustrating a novel valve mounting and guiding element included in the valve, also indicating in solid and dotted lines a method of fabricating the same at very low cost.

Spider 23 is fabricated from length of standard stainless steel, tubular stock of the type illustrated in Fig. 4 and designated 24. This tube is slotted at one end thereof at 25 to define a plurality of individual elongated arms 26, shown in their preliminary position in dotted lines in Fig. 4. In the illustrated embodiment there are four such arms, and it is desirable that the number thereof be minimized as much as is consistent with strength and stability, in order to minimize the obstruction offered by the member 23 to flow through chamber 12. When slotted in the manner described, the tube 24 is placed between suitable dies and the arms 26 conformed outwardly and downwardly to the final solid line position illustrated in Figs. 1 and 4 to provide a supporting spider, the extreme ends 27 of said arms being bent to a radial disposition. The inner diameter of tube 24 is slightly larger than the diameter of stem 20, so as to guidingly receive the latter, and the arms extend radially to an extent somewhat greater than the inner diameter of outlet connection 15.

In assembling the valve structure, the valve element 17 is inserted through the outlet connection, the latter being of adequate size for this purpose. Spring 21 and cup retainer 22 are then slid over the stem 20, followed by the spider 23. The arms 26 of the latter are compressed and the spider shoved axially, compressing spring 21, until the extremities 27 of the spider snap into the internal groove 16. It will be understood that the spring 21 is designed as to size and material so that a desired, predetermined spring-loading action is asserted on valve element 17.

In operation, the check valve is characterized by a minimum of turbulence, due to the minimum of material disposed in the line of flow, and is unfailingly operative. Should it be desired to remove any of the parts for repair, cleaning or replacement, this is easily and quickly effected by simply compressing the spider arms 26 to release the same from groove 16, and withdrawing the spider.

The saving in manufacturing cost flowing from the use of a unitary, stamped sheet metal spider is apparent, however, in some instances it may be desirable to fabricate this guiding means from a plurality of parts appropriately secured together. By the same token, manufacture of other elements of the valve from materials or by procedures other than those described above may be indicated; and therefore it is not desired that the invention be construed any more limitedly than is reasonably indicated by the scope of the appended claims.

We claim:

1. In a valve construction of the type described, a hollow valve body providing a valve chamber in communication with inlet and outlet passages, a valve and attached stem reciprocable in said chamber, spring means urging said valve in one direction, and means for guiding said valve stem and sustaining said spring means, comprising a one-piece, tubular spider element slidably receiving said stem and provided with a plurality of outwardly extending, outwardly springable arms in substantially spaced relation to one another, said arms being inwardly compressed relative to said stem when said spider element is installed in said body and said body being springingly engageable by said arms on its internal surface to sustain said spider in the axial direction, said spider element including an axially extending, tubular, stem receiving portion and said arms being integrally connected by acute angle bends to one end of said portion and disposed rearwardly relative to that end and in axially overlapped relation to said portion.

2. In a valve construction of the type described, a hollow valve body providing a valve chamber in communication with inlet and outlet passages, a valve and attached stem reciprocable in said chamber, spring means urging said valve in one direction, and means for guiding said valve stem and sustaining said spring means, comprising a one-piece, tubular spider element slidably receiving said stem and provided with a plurality of outwardly springable and reversely extending arms in substantially spaced relation to one another, said spider element including an axially extending, tubular, stem receiving portion and said arms being integrally connected by acute angle bends to one end of said portion and disposed rearwardly relative to that end and in axially overlapped relation to said portion, said body having an internal annular groove expandingly and springingly engageable by said arms to sustain said spider in the axial direction.

3. A mount for a valve of the type characterized by a hollow valve body and valve member reciprocable therein, said mount comprising a tubular spider having a guiding portion of substantial axial length in which said valve member is slidably received and a plurality of arms substantially spaced at their outer ends from one another and compressible toward said guiding portion for insertion in said valve body, said arms being resiliently expansible outwardly into engagement with said body to sustain the spider axially, said arms being integrally connected to an end of said guiding portion by acute angle bends and being disposed rearwardly relative to that end and in axially overlapped relation to said portion.

4. A mount for a valve of the type characterized by a hollow valve body and valve member reciprocable therein, said mount comprising a tubular sheet metal spider having a guiding portion of substantial axial length in which said valve member is slidably received and a plurality of outwardly extending spring arms integrally connected to said guiding portion by acute angle bends and disposed in reversed, axially overlapping relation to said guiding portion, said arms being substantially spaced at their outer ends from one another and being compressible toward said guiding portion for insertion in said valve body, said arms being resiliently expansible outwardly into engagement with said body to sustain the spider axially.

LEONARD F. GRIFFITH.
DOUGLAS K. McILVAINE.

REFERENCES CITED

The following references are of record in the file of this patent:

UNITED STATES PATENTS

| Number | Name | Date |
|---|---|---|
| 833,559 | Stebbins | Oct. 16, 1906 |
| 1,111,319 | Paulsmeier | Sept. 22, 1914 |
| 1,668,891 | Dudley | May 8, 1928 |
| 1,948,676 | Riek | Feb. 27, 1934 |
| 1,963,684 | Shimer | June 19, 1934 |

FOREIGN PATENTS

| Number | Country | Date |
|---|---|---|
| 4,129 | Great Britain | of 1908 |
| 9,164 | Great Britain | of 1915 |
| 155,165 | Austria | of 1938 |
| 460,840 | Germany | of 1928 |